May 26, 1970   F. F. GANS ET AL   3,514,174
INFRARED INTERFERENCE FILTERS
Filed May 10, 1966
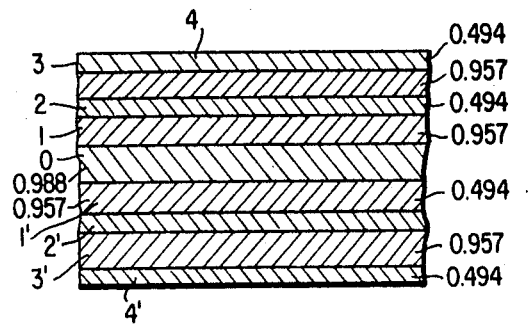
FIG. 1
FIG. 2
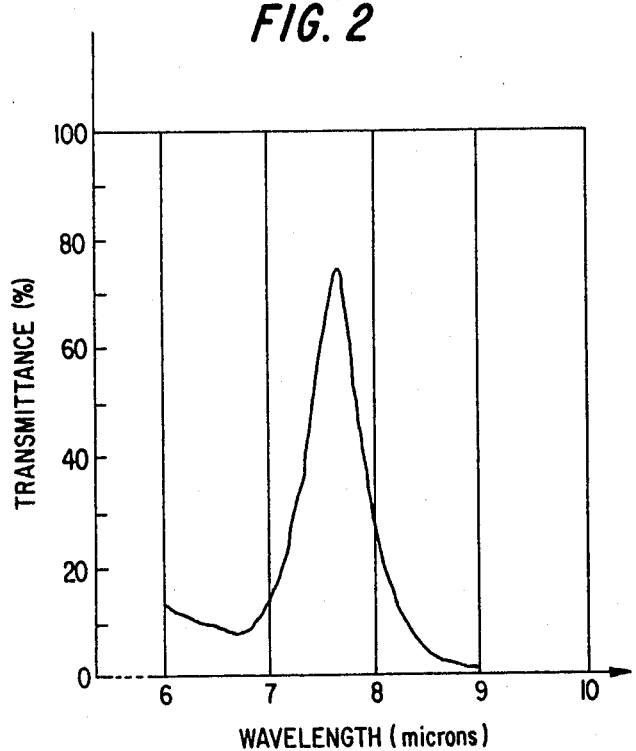
INVENTORS
FRANCOIS F. GANS
JACQUELINE J. PRIOU
BY *Abraham A. Saffitz*
ATTORNEY

United States Patent Office 3,514,174
Patented May 26, 1970

---

3,514,174
INFRARED INTERFERENCE FILTERS
François F. Gans, Gif-sur-Yvette, and Jacqueline J. Priou, Paris, France, assignors to Centre National de la Recherche Scientifique, Paris, France, a corporation of France
Filed May 10, 1966, Ser. No. 548,930
Claims priority, application France, May 11, 1965, 16,627
Int. Cl. G02b 1/10
U.S. Cl. 350—1    5 Claims

ABSTRACT OF THE DISCLOSURE

In a multilayer interference transmittance filter for use in the infrared region of the spectrum which includes a high refraction index material and a low refraction index material, the high refraction index material consisting of arsenic telluride and the low refraction index material being selected from the group consisting of silver chloride, lead chloride and zinc sulphide.

---

This invention relates to new and improved multilayer interference filters for use in the middle and longer wavelength infrared regions.

Interference filters are well-known devices for passing selected radiation frequencies and simultaneously reflecting undesirable frequencies. Such filters consist essentially of alternating layers of a material with a relatively high refraction index ($n_H$), and one with a relatively low refraction index ($n_L$). If the thickness of the layers is properly chosen, the reflections of certain wavelengths from the boundaries between the materials are reinforced and thereby removed from the transmitted radiation beam. The other wavelengths pass through the filter.

Interference filters are widely used in the field of visible radiation since they have various advantages with respect to other types of radiation filters, the most commonly used being the possibility of filtering very narrow spectral bands and fine rays.

Although it is relatively easy to prepare filters in the visible region of the spectrum, this is not the case in the infrared, partly because of difficulties in checking on the manufacture, and also because of the longer wavelength of the radiations.

These difficulties become clear when we recall the construction principles of interference filters. As we know, these consist of stacks of thin layers of alternately high and low refraction index ($n_H$ and $n_L$) material, of optical thickness equal to a quarter of the wavelength $\lambda$ we wish to isolate. If we call $e_H$ and $e_L$ the thicknessess of the high and low index layers, we obtain the expression $$n_H e_H = n_L e_L = \lambda/4 \qquad (1)$$

The completed filter shows the following structure

H L H L—H L H H L H—L H L H where H and L respectively refer to high and low refraction index materials.

We note in the centre two successive layers of the same index, which effectively form only one, of double thickness. A given filter thus contains an odd number of layers and in fact filters are made with 3, 5, 7, 9 . . . layers.

It is shown by calculation of the optical characteristics of such a system, and confirmed with very good precision by experience, that to obtain a filter of given optical characteristics, the number of layers necessary is smaller as the ratio $\rho = n_H/n_L$ is larger.

Workers attempted in the past to find substances of index $n_H$ as high as possible and $n_L$ as low as possible, and by using combinations such as zinc sulphide ZnS, of index 2.28, as high-index material, and magnesium fluoride $MgF_2$, of index 1.38, as low-index material, they have succeeded in constructing filters which are completely satisfactory for the visible region of the spectrum.

To prepare interference filters in the infrared region of the spectrum, workers attempted to apply the same principles, using combinations of tellurium Te of refraction index close to 5, or germanium Ge of index 4.05, with substances such as magnesium fluoride $MgF_2$ of mean index 1.34 in infrared, sodium chloride NaCl of index 1.52 and thallium chloride of index 2.10.

Attention must be paid however in the search for a high index ratio relating to interference filters for the infrared spectrum region. In fact, while it is true that a filter of given characteristics will be obtained with a minimum number of layers when $n_L$ is as small as possible, it should not be forgotten that, according to Equation 1, it is necessary, when $\lambda$ becomes relatively high, to deposit layers of comparatively large thickness $e_L$. Indeed, since $e_L = \lambda/4n_L$, when $\lambda$ increases, $e_L$ also increases. The stage where it is difficult to obtain a homogeneous high quality layer with the thickness deposited is thus quickly reached.

We thus observe that, whereas on the one hand, the number of layers necessary remains small, when $\lambda$ is high it is difficult to obtain low-index layers because of their thickness. In order to avoid this difficulty, we had the idea of using, as low-index materials, substances used in the prior art as high-index materials in the interference filters for the visible spectrum region. Since $n_L$ is higher than in the prior art interference filters for the infrared spectrum region, $e_L$ can be kept reasonably low, but $n_L$ is still sufficiently below the value of $n_H$ so that the number of layers deposited is not too great. We have found that a ratio $\rho = n_H/n_L$ around 2 is very suitable. It is worth noting in this respect that in the case of the filter for the visible spectrum region made with the very satisfactory combination $ZnS/MgF_2$, the ratio $n_H/n_L$ is only 1.66.

It is therefore the primary object of the present invention to provide a multilayer interference filter with optical properties suitable for use in the infrared region.

Another object of this invention is to provide such a filter which is non-hygroscopic.

Another object of this invention is to provide interference filters in which the layers are particularly strong and adherent.

Another object of this invention is to provide interference filters which can be used without special precautions from the viewpoint of mechanical protection; in particular the filters of the invention can be employed without mounting.

Other objects, features and advantages of this invention will be apparent from the following description, the appended claims and the attached drawing in which:

FIG. 1 is a cross-sectional view illustrating one form of embodiment of the present invention and FIG. 2 shows a transmittance curve obtained from an example of filter given below.

We have discovered that the combination of the arsenic tellurides $As_2Te_3$ or $As_2Te_5$ as material for the high-index layer ($n_H = 3.8$ for the tritelluride and $n_L = 3.9$ for the pentalluride) and silver chloride AgCl, lead chloride $PbCl_2$ or zinc sulphide ZnS as material for the low-index layer was particularly favourable from viewpoint of strength and stability.

Arsenic telluride has the advantage that it is particularly easy to evaporate under vacuum in the form of homogeneous uniform layers at a temperature of 475° C., no special precautions being necessary. It is transparent in all the infrared band between 3 and 30μ.

Zinc sulphide, silver chloride and lead chloride have respective refraction indices, at 10μ, around 2.20–1.98–2.20, and solubilities: $69.10^{-5}$, $89.10^{-6}$ $67.10^{-2}$. These materials are of common use to form the higher refractive layers of conventional interference filters.

The melting points are 455° C. for AgCl, 510° C. for $PbCl_2$. ZnS vaporises very easily, its sublimation point at atmospheric pressure being only 1200° C. These three substances can be deposited in relatively large thicknesses without cracking, to form very adherent layers on the various infrared-transparent supports and on arsenic tellurides.

Example: An interference filter conforming to the invention, exhibiting maximum transparency at $\lambda = 7.70\mu$ is shown in FIG. 1 and is made up of alternate layers of arsenic tritelluride and silver chloride of thicknesses successively equal to

| Layer reference numeral | Thickness of layer in μ | Nature of layer |
| --- | --- | --- |
| 4 | 0.494 | $As_2Te_3$ |
| 3 | 0.957 | AgCl |
| 2 | 0.494 | $As_2Te_3$ |
| 1 | 0.957 | AgCl |
| 0 | 0.988 | $As_2Te_3$ |
| 1' | 0.957 | AgCl |
| 2' | 0.494 | $As_2Te_3$ |
| 3' | 0.957 | AgCl |
| 4' | 0.494 | $As_2Te_3$ | deposited on a magnesium oxide support (periclase). This filter can be used without mounting and it is shockproof. It can be dropped on floor without damage.

FIG. 1 represents the stack of layers 0–4 and 1'–4'. Opposite each layer there is indicated its reference numeral and its thickness in microns.

The transmittance characteristic curve of the interference filter of the above example is shown in FIG. 2.

The transmittance is given in percentage and the wavelength is expressed in microns. The maximal transmittance is 0.8 and the Q factor of the filter (the wavelength at maximum divided by the width at mid-amplitude) is near 16 which is a good result for a nine-layer filter.

What we claim is:

1. In a multilayer transmittance filter for use in the infrared region of the spectrum comprising an infrared permeable substrate and, on said substrate, an odd number of adjacent layers forming a stack of layers and having each, except one particular layer, an official thickness substantially equal to ¼ of a wevelength to be transmitted and alternately constituted by a high refraction index material and a low refraction index material, said particular layer having an official thickness substantially equal to ½ of said wavelength, the improvement that the high index material consists of arsenic telluride and the low index material is selected from the group consisting of silver chloride, lead chloride and zinc sulphide, said particular layer being located at the middle of said stack.

2. In a multilayer interference transmittance filter the improvement as set forth in claim 1 wherein the arsenic telluride is arsenic tritelluride.

3. In a multilayer interference transmittance filter the improvement as set forth in claim 1 wherein the arsenic telluride is arsenic pentatelluride.

4. In a multilayer interference transmittance filter, the improvement as set forth in claim 1, in which the particular layer having an optical thickness substantially equal to ½ of the wavelength to be transmitted is made of the low refraction index material.

5. In a multilayer interference transmittance filter, the improvement as set forth in claim 1 in which the particular layer having an optical thickness substantially equal to ½ of the wavelength to be transmitted is made of the high refraction index material.

References Cited

UNITED STATES PATENTS

| 2,668,478 | 2/1954 | Schroder | 350—1 |
| 2,852,980 | 9/1958 | Schroder | 350—1 |
| 3,033,693 | 5/1966 | Carnall et al. | 350—1 |

OTHER REFERENCES

Baumeister, P. W., "Notes on Multilayer Optical Filters," Institute of Optics, College of Engr. & Applied Science, The Univ. of Rochester, Rochester, N.Y., vol. 7, Multilayer Filters. Recv'd. Apr. 13, 1964. Found in Gp 259, pp. 20–81 through 20–83.

DAVID SCHONBERG, Primary Examiner

T. H. KUSMER, Assistant Examiner

U.S. Cl. X.R.

117—33.3; 350—166